(12) United States Patent
Kim (10) Patent No.: US 10,703,355 B2
(45) Date of Patent: Jul. 7, 2020

(54) VEHICLE AND METHOD FOR AUTOMATICALLY SELECTING DRIVING MODE OF THE SAME

(71) Applicants: Hyundai Motor Company, Seoul (KR); Kia Motors Corporation, Seoul (KR)

(72) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 16/009,827

(22) Filed: Jun. 15, 2018

(65) Prior Publication Data

US 2019/0176802 A1  Jun. 13, 2019

(30) Foreign Application Priority Data

Dec. 11, 2017  (KR) .......................... 10-2017-0168937

(51) Int. Cl.
*B60W 20/12* (2016.01)
*B60W 20/40* (2016.01)
*B60W 20/13* (2016.01)
*B60W 10/06* (2006.01)
*B60W 50/14* (2020.01)
*B60W 10/08* (2006.01)

(52) U.S. Cl.
CPC ............ *B60W 20/12* (2016.01); *B60W 10/06* (2013.01); *B60W 10/08* (2013.01); *B60W 20/13* (2016.01); *B60W 20/40* (2013.01); *B60W 50/14* (2013.01); *B60W 2050/146* (2013.01); *B60W 2510/244* (2013.01); *B60W 2556/50* (2020.02); *Y10S 903/93* (2013.01)

(58) Field of Classification Search
CPC ...... B60W 20/12; B60W 10/08; B60W 50/14; B60W 10/06; B60W 20/13; B60W 20/40; B60W 2050/146; B60W 2510/244; B60W 2550/402; B60W 2050/0075; B60W 2540/12; B60W 2540/10; B60W 2540/14; B60W 2710/244; B60W 50/082; B60W 50/0097; B60W 10/30; B60W 20/00; Y10S 903/93

See application file for complete search history.

(56) References Cited

U.S. PATENT DOCUMENTS

2013/0173097 A1* 7/2013 Jotanovic ........... G01C 21/3469
                                                              701/22
2016/0167645 A1* 6/2016 Park .................. B60W 50/0097
                                                              701/22

(Continued)

*Primary Examiner* — Rodney A Butler
(74) *Attorney, Agent, or Firm* — Mintz Levin Cohn Ferris Glovsky and Popeo, P.C.; Peter F. Corless (57) ABSTRACT

A vehicle is controlled such that a driving mode of the vehicle is automatically selected, where the vehicle can be a Plug-In Hybrid Electric Vehicle (PHEV). The vehicle automatically selects an optimum driving mode from among various driving modes capable of being selected by the PHEV according to a driving situation based on a destination established by a driver who uses a navigation system, or recommends various driving modes to the driver, resulting in increased convenience of use. Through selection of an appropriate driving mode, the vehicle can be driven with superior fuel efficiency, resulting in increased driving efficiency.

15 Claims, 4 Drawing Sheets

(56) References Cited

U.S. PATENT DOCUMENTS

2016/0200315 A1* 7/2016 Fracchia ................ B60K 6/448
 701/22
2018/0162399 A1* 6/2018 Prakah-Asante ... B60W 30/182

* cited by examiner

VEHICLE AND METHOD FOR AUTOMATICALLY SELECTING DRIVING MODE OF THE SAME

CROSS-REFERENCE TO RELATED APPLICATION

This application claims under 35 U.S.C. § 119(a) the benefit of Korean Patent Application No. 10-2017-0168937, filed on Dec. 11, 2017 in the Korean Intellectual Property Office, the entire contents of which are incorporated herein by reference.

BACKGROUND

1. Technical Field

The present disclosure relates to a vehicle and a method for controlling the same, more particularly, to an arrangement for automatically selecting a driving mode of a Plug-in Hybrid Electric Vehicle (PHEV).

2. Description of the Related Art

A vehicle may be classified into an internal combustion vehicle (general engine vehicle), a hybrid electric vehicle, and a Fuel Cell Electric Vehicle (FCEV) according to power sources for generating driving force.

The hybrid electric vehicle includes a motor and an internal combustion engine, drives on the road using mechanical power of the engine and electrical power of the motor, and operates the motor using a battery.

A driving mode of the hybrid vehicle may be classified into three modes, i.e., an electric vehicle (EV) mode, a hybrid electric vehicle (HEV) mode, and an automatic (AUTO) mode. During the EV mode, the hybrid vehicle is driven only using electrical power of the motor. During the HEV mode, the hybrid vehicle is driven using a combination of engine power and electrical power of the motor. During the AUTO mode, the hybrid vehicle is driven by properly distributing engine power and electrical power of the motor.

Whereas State of Charge (SOC) of a battery of the hybrid vehicle is variably controlled by engine operation based on a driving state, the engine operation is dynamically changed, such that it is impossible for the hybrid vehicle to immediately reflect the driving state into SOC control of the battery. In order to address this issue, an improved Plug-in Hybrid Electric Vehicle (PHEV) has recently been developed.

The PHEV has a relatively larger battery capacity than a conventional HEV, such that the PHEV has a higher degree of freedom than the conventional HEV in terms of fuel efficiency control, such that the PHEV may be controlled in various ways using the larger battery capacity and higher degree of freedom. For example, when the PHEV travels a short distance within easy commuting distance, the PHEV may charge a high-voltage battery with external power, such that the PHEV may travel in an Electric Vehicle (EV) mode or a Charge Depleting (CD) mode. During middle-distance or long-distance traveling of the PHEV, the PHEV may generally enter the AUTO mode so that the PHEV is driven in the AUTO mode in which engine power and motor power are properly distributed until reaching a destination, resulting in optimum efficiency of the PHEV.

However, the PHEV has disadvantage in that a driver who rides in the PHEV must directly select a necessary driving mode corresponding to any one of the EV(CD) mode, the HEV(CS) mode, and the AUTO mode using a button (switch), such that the driver of the PHEV has difficulty in correctly recognizing/selecting advantages of individual driving modes according to driving situations.

SUMMARY

Therefore, it is an aspect of the present disclosure to provide a vehicle for automatically selecting a driving mode of a Plug-in Hybrid Electric Vehicle (PHEV) according to a destination or automatically recommending the selected driving mode to a driver who rides in the PHEV, and a method for controlling the same, in particular, a method for automatically selecting a driving mode of the PHEV.

In accordance with an aspect of the present disclosure, a vehicle includes: a battery; a battery sensor configured to measure a State of Charge (SOC) of the battery; an Audio Video Navigation (AVN) device configured to establish a destination by a driver who rides in the vehicle; and a controller configured to calculate a distance to the destination by analyzing information regarding a route to the established destination, and calculate an Electric Vehicle (EV) available range according to a level of the SOC of the battery, wherein the controller selects a driving mode by comparing the distance to the destination with the EV available range.

The driving mode may include: an electric vehicle (EV) mode in which the vehicle is driven only using electrical power of a motor; a hybrid electric vehicle (HEV) mode in which the vehicle is driven using a combination of engine power and the electrical power according to the SOC level; and an automatic (AUTO) mode in which the vehicle is driven using distribution of the engine power and the electrical power according to the SOC level.

When the distance to the destination is shorter than the EV available range, the controller may select the EV mode as the driving mode.

When the distance to the destination is longer than the EV available range, the controller may select the driving mode according to the SOC level.

The controller may compare the SOC level with an EV mode allowable SOC, and may select the HEV mode as the driving mode when the SOC level is less than the EV mode allowable SOC.

When the SOC level is higher than the EV mode allowable SOC, the controller may select the AUTO mode as the driving mode.

The vehicle may further include: a power device configured to generate driving power using the engine power and the electrical power, wherein the controller controls the power device according to the selected driving mode.

The controller may compare the distance to the destination with the EV available range, and recommends the driving mode to the driver.

In accordance with another aspect of the present disclosure, a vehicle configured to be driven using at least one of engine power and electrical power of a motor includes: a battery configured to supply drive energy of the motor; a battery sensor configured to measure a State of Charge (SOC) of the battery; an Audio Video Navigation (AVN) device configured to search for a route to a destination established by a driver who rides in the vehicle; and a controller configured to calculate a distance to the destination by analyzing the searched route information, and calculate an Electric Vehicle (EV) available range according to a level of the SOC of the battery, wherein the controller selects a driving mode on the basis of the route analysis result and the calculated EV available range.

The controller may recommend the driving mode to the driver on the basis of the route analysis result and the calculated EV available range.

The controller may control the engine power and the electrical power according to the selected driving mode.

In accordance with an aspect of the present disclosure, a method for controlling a vehicle that includes an engine, a motor, and battery, the vehicle configured to be driven using at least one of engine power and electrical power of the motor includes: allowing a driver who rides in the vehicle to establish a destination through an Audio Video Navigation (AVN) device; calculating a distance to the destination by analyzing information regarding a route to the established destination; measuring a State of Charge (SOC) of the battery, and calculating an electric vehicle (EV) available range according to a level of the SOC; and comparing the calculated distance to the destination with the calculated EV available range, and selecting a driving mode according to the result of comparison, wherein the driving mode includes an electric vehicle (EV) mode in which the vehicle is driven only using the electrical power; a hybrid electric vehicle (HEV) mode in which the vehicle is driven using a combination of the engine power and the electrical power according to the SOC level; and an auto (AUTO) mode in which the vehicle is driven using distribution of the engine power and the electrical power according to the SOC level.

The method may further include selecting the EV mode as the driving mode when the distance to the destination is shorter than the EV available range.

When the distance to the destination is longer than the EV available range, the method may further include comparing the SOC level with the EV mode allowable SOC, and selecting the driving mode according to the result of comparison.

The method may further include comparing the distance to the destination with the EV available range, and recommending the driving mode to the driver.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the embodiments of the present disclosure, examples of which are illustrated in the accompanying drawings, wherein like reference numerals refer to like elements throughout.

A vehicle and method for controlling the same, in particular, a method for automatically selecting a driving mode of a Plug-In Hybrid Electric Vehicle (PHEV) according to an embodiment of the present disclosure will hereinafter be described with reference to the attached drawings.

Figure 1:
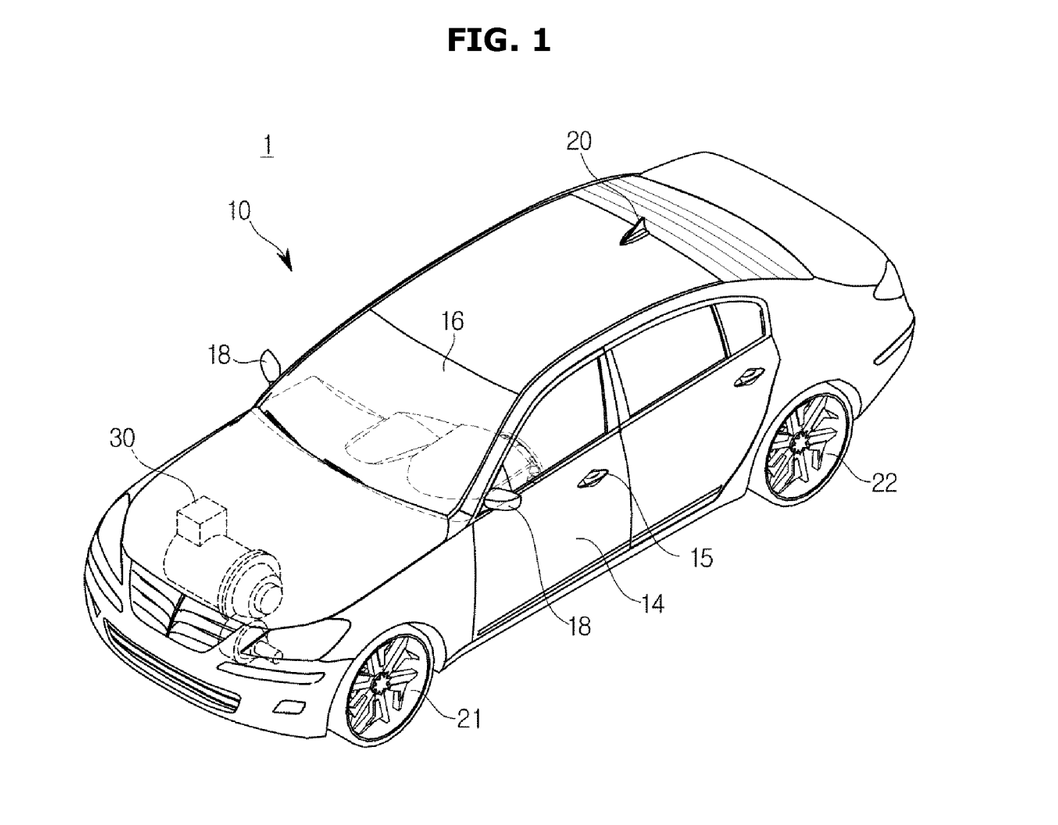
FIG. 1 is a view illustrating the appearance of a vehicle according to an embodiment of the present disclosure.

FIG. 1 is a view illustrating the appearance of a vehicle 1 according to an embodiment of the present disclosure.

Referring to FIG. 1, the vehicle 1 according to the embodiment includes a body 10 forming the appearance of the vehicle 1, doors 14 to shield an indoor space of the vehicle 1 from the outside, a windshield 16 to provide a forward view of the vehicle 1 to a vehicle driver who rides in the vehicle 1, side-view mirrors 18 to provide a rear view of the vehicle 1 to the vehicle driver, vehicle wheels 21 and 22, and a drive device 30 to rotate the vehicle wheels 21 and 22.

The doors 14 are rotatably provided at the right and left sides of the body 10 so that a vehicle driver can ride in the vehicle 1 when any of the doors 14 is open and an indoor space of the vehicle 1 can be shielded from the outside when the doors 14 are closed. The doors 14 may be locked or unlocked by door handles 15. The door handles 15 may be locked or unlocked by the vehicle driver who directly operates a button or lever by approaching the vehicle 1, or may be remotely locked or unlocked by a remote controller, etc. at a remote site distant from the vehicle 1.

The windshield 16 is provided at a front upper portion of the body 10 so that a vehicle driver who rides in the vehicle 1 can obtain visual information of a forward direction of the vehicle 1. The windshield 16 may also be referred to as a windshield glass.

The side-view mirrors 18 may include a left side-view mirror provided at the left of the body 10 and a right side-view mirror provided at the right of the body 10, so that the driver who rides in the vehicle 1 can obtain visual information of the lateral and rear directions of the vehicle 1.

In addition, the vehicle 1 may include an antenna 20 provided at a top surface of the body 10.

The antenna 20 may receive broadcast/communication signals, for example, telematics signal, DMB signal, digital TV signal, GPS signal, etc. The antenna 20 may be a multi-functional antenna configured to receive various kinds of broadcast/communication signals, or may be a single functional antenna configured to receive any one of broadcast/communication signals.

The wheels 21 and 22 may include front wheels 21 provided at the front of the body 10 and rear wheels 22 provided at the rear of the body 10. The drive device 30 may provide rotational force to the front wheels 21 or the rear wheels 22 in a manner that the body 10 moves forward or backward. The drive device 30 may include an engine 300 (see FIG. 3) to generate rotational force by burning fossil fuels or a motor to generate rotational force upon receiving power from a battery 200 (see FIG. 3).

The vehicle 1 may include the engine 300 (see FIG. 3), the battery 200 (see FIG. 3), and the motor 30 (see FIG. 3), and may be a Plug-in Hybrid Electric Vehicle (PHEV) configured to travel on the road using mechanical power of the engine 300 and electrical power of the motor 30. The PHEV is a vehicle that is driven simultaneously using power of the internal combustion engine 300 and electrical power of the battery 200 while being driven using electrical power of the battery 200 charged with electricity received from an external power source.

Figure 2:
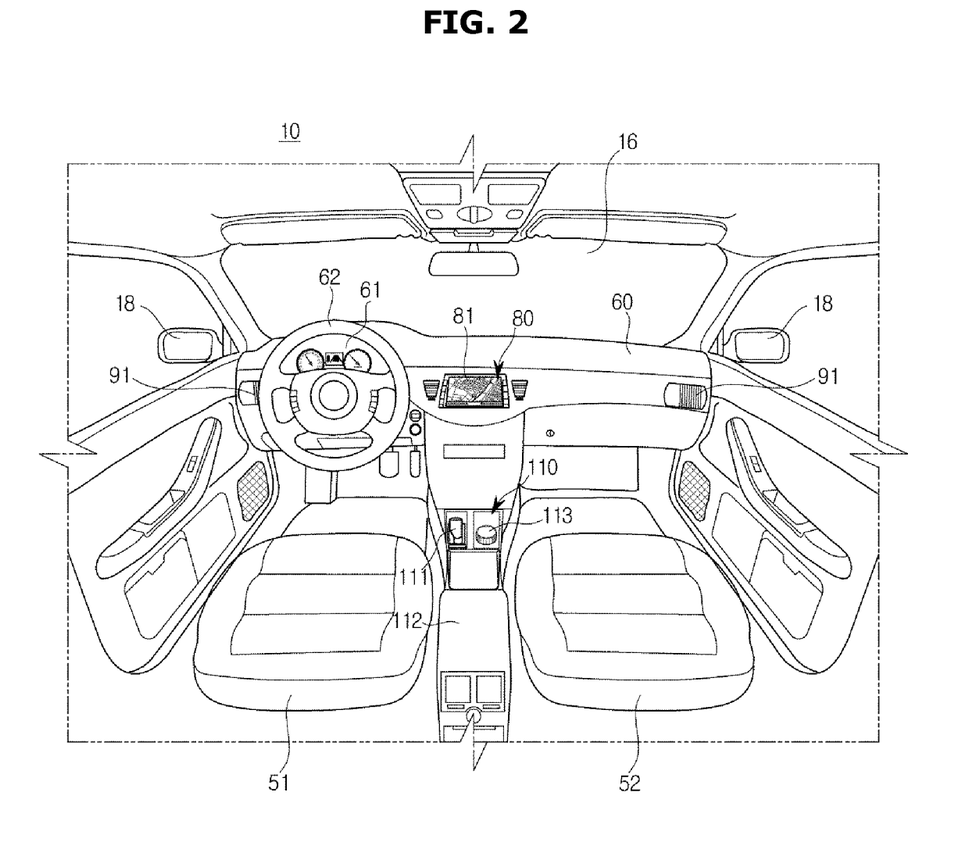
FIG. 2 is a view illustrating the internal structure of the vehicle according to an embodiment of the present disclosure.

FIG. 2 is a view illustrating the internal structure of the vehicle 1 according to an embodiment of the present disclosure.

Referring to FIG. 2, the indoor space of the vehicle 1 may include seats 51 and 52 on which passengers of the vehicle 1 sit, a steering wheel 62 mounted to the driver seat 51 on which a driver from among the passengers sits, a cluster 61 mounted to a front portion of the body 10 from the steering wheel 62 and displaying operation information of the vehicle 1, and a dashboard 60 to which various devices connected to the cluster 61 to manipulate the vehicle 1 are mounted.

In particular, the dashboard 60 may protrude from a lower portion of the windshield 16 toward the seats 51 and 52, such that the vehicle driver who looks forward can manipulate various devices mounted to the dashboard 60.

For example, various devices mounted to the dashboard 60 may include an Audio Video Navigation (AVN) device 80 mounted to a center fascia corresponding to the center region of the dashboard 60, an air outlet 91 of an air conditioner 90 (see FIG. 3) mounted to a side surface of a touchscreen 81 of the AVN device 80, and various input devices mounted to a lower portion of the AVN device 80.

The AVN device 80 may perform an audio function, a video function, and a navigation function according to manipulation of the passenger, and may be connected to a controller (i.e., a head unit) for controlling the vehicle 1.

The AVN device 80 may also perform two or more functions as necessary. For example, the AVN device 80 may reproduce music recorded on a CD or USB by turning on the audio function, and at the same time may perform the navigation function. In addition, the AVN device 80 may display DMB images by turning on the video function, and at the same time may perform the navigation function.

The AVN device 80 may display a screen image related to the audio function, a screen image related to the video function, or a screen image related to the navigation function on the touchscreen 81. The touchscreen 81 may display a charging state of the electric vehicle 1.

The touchscreen 81 may be implemented by any one of a Liquid Crystal Display (LCD) panel, a Light Emitting Diode (LED) panel, an Organic Light Emitting Diode (OLED) panel, etc. without being limited thereto. The touchscreen 81 may perform a screen display function and an input function of instructions or commands.

The touchscreen 81 may output a screen image including predetermined images to the outside according to an operating system (OS) for driving/controlling the AVN device 80 and an application being executed in the AVN device 80, or may receive instructions or commands.

The touchscreen 81 may display a basic screen image according to the executed application. If touch manipulation is not performed, the touchscreen 81 may display the basic screen image.

The touchscreen 81 may also display a touch manipulation screen image according to situations. The touch manipulation screen may indicate a screen image capable of receiving the user's touch manipulation.

The touchscreen 81 may be any one of a resistive touchscreen which senses the user's touch manipulation by recognizing pressure, a capacitive touchscreen which senses the user's touch manipulation based on the effect of capacitive coupling, an optical touchscreen based on infrared light, or an ultrasonic touchscreen which uses ultrasound, without being limited thereto.

The touchscreen 81 may control the AVN device 80 embedded in the vehicle 1 to interact with the user, and may receive a user command through touch interaction or the like. Since characters or menus displayed on the touchscreen 81 are selected, the touchscreen 81 may receive a user command as an input.

In this case, the AVN device 80 may be referred to as a navigation terminal or a display device, and may also be referred to by various terms well known to those skilled in the art as necessary.

In addition, the AVN device 80 may include a Universal Serial Bus (USB) port, and the like, may be connected to communication terminals, for example, a smartphone, a Portable Multimedia Player (PMP), an MPEG Audio Layer-3 (MP3) player, a Personal Digital Assistants (PDA), etc., and may reproduce audio and video files as necessary.

The air outlet 91 of the air conditioner (not shown) may be provided to both sides of the touchscreen 81 of the dashboard 60. The air conditioner 90 may automatically control the air-conditioning environment (including indoor/outdoor environmental conditions of the vehicle 1, air intake/exhaust process, air circulation, cooling/heating, etc.), or may control the air-conditioning environment in response to a control command of the user.

For example, the air conditioner 90 may perform heating and cooling of the air, and may discharge the heated or cooled air through the air outlet 91, thereby controlling a temperature of the indoor space of the vehicle 1.

The driver or passenger may control the air conditioner 90 to adjust the temperature of the internal space of the body 10, before the driver or passenger gets in the vehicle 1.

Meanwhile, the interior part of the vehicle 1 may include a center console 110 disposed between the seats 51 and 52, and a tray 112 connected to the center console 110. The center console 110 may include a gear lever 111 and a jog-wheel or various key-types of input buttons 113, without being limited thereto.

Figure 3:
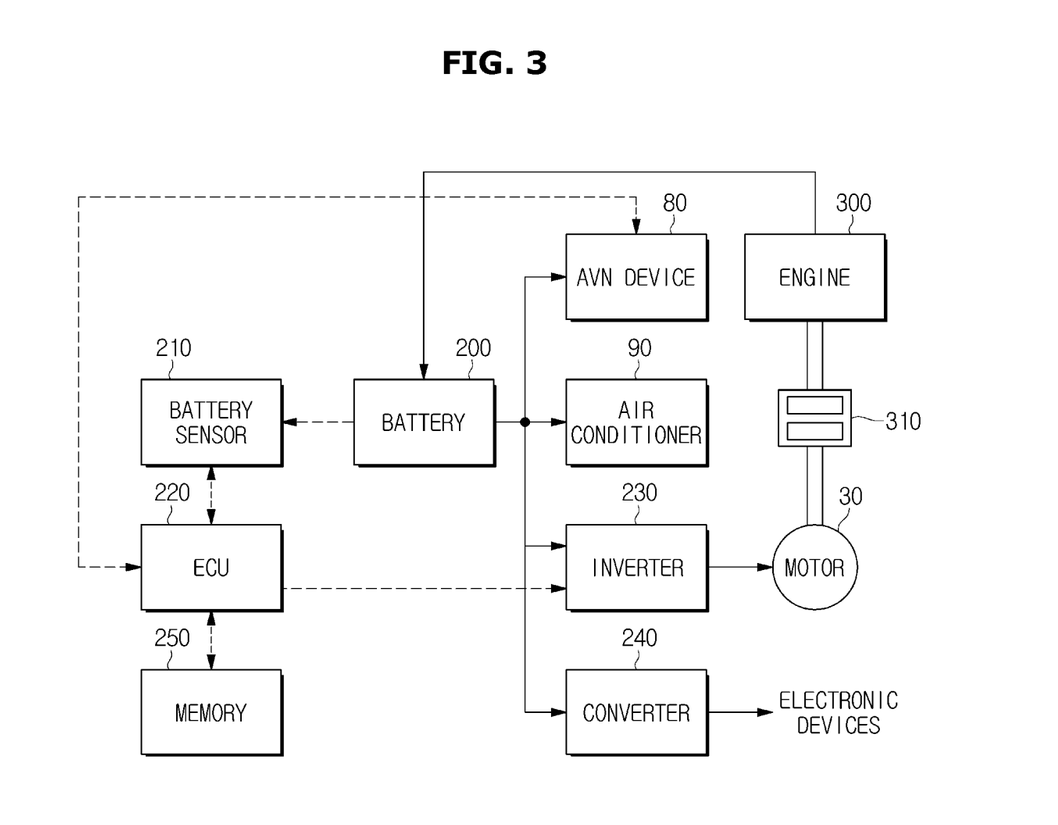
FIG. 3 is a block diagram illustrating the vehicle according to an embodiment of the present disclosure.

FIG. 3 is a block diagram illustrating the vehicle according to an embodiment of the present disclosure.

Referring to FIG. 3, the vehicle 1 may include not only constituent elements shown in FIGS. 1 and 2, but also a battery 200, a battery sensor 210, a controller 220, an inverter 230, a converter 240, a memory 250, an engine 300, and a clutch 310.

Dotted arrows shown among the controller 220, the AVN device 80, the battery 200, the inverter 230, and the memory 250 may denote flow of control signals transmitted through a Controller Area Network (CAN), and solid arrows shown among the battery 200, the air conditioner 90, the inverter 230, the converter 240, and the motor 30 may denote flow of electrical power supplied from the battery 200.

The battery 200 may store electrical energy generated by rotational force of the engine 300, and may supply power to various electronic devices embedded in the vehicle 1. For example, during driving of the vehicle 1, a generator may convert rotational energy of the engine 300 into electrical energy, and the battery 200 may receive electrical energy from the generator and store the received electrical energy therein. In order to allow the vehicle 1 to travel on the road, the battery 200 may supply power for starting the engine 300 to a starter motor, or may supply power to electronic devices embedded in the vehicle 1.

The battery 200 may store power supplied from an external charger (not shown) therein.

Power stored in the battery 200 may be used as drive energy of the motor 301.

A battery sensor (BS) 210 mounted to the battery 200 may measure state information of the battery 200, i.e., SOC of the battery 200, and may output the measured battery state information (SOC) to the controller 220. For example, the battery sensor 210 may measure the residual voltage and current of the battery 200, and may output the measured voltage and current to the controller 220.

The battery sensor 210 may measure a voltage, current, and temperature of the battery 200, and may measure State of Charge (SOC) of the battery 200, State of Health (SOH) of the battery 200, and State of Function (SOF) of the battery 200 according to the measured result.

Battery charging state information (i.e., voltage, current, SOC, SOF, temperature, etc.) measured by the battery sensor 210 may be transmitted to the controller 220 through LIN communication.

SOC may indicate a difference in percentage (%) between a current 200 and a fully-charged battery, and may be identical in concept to a fuel gauge of the vehicle 1 including an internal combustion engine.

SOH may indicate a difference between the current battery 200 and a new battery.

SOF may indicate how much performance of the battery 200 is matched with actual requirements during the usage time of the battery 200, such that the SOF may be decided based on an SOC, an SOH, a battery 200's operation temperature, and a charging/discharging history.

The controller 220 may be used as a processor configured to control overall operation of the vehicle 1, and may be a processor of an Electronic Control Unit (ECU) configured to control overall operation of a power system. The controller 220 may control various modules and devices embedded in the vehicle 1. In accordance with one embodiment, the controller 220 may generate a control signal for controlling various modules and devices embedded in the vehicle 1, such that the controller 220 may control operations of constituent elements using the control signal.

The controller 220 may use a Controller Area Network (CAN) of the vehicle 1. The CAN may refer to a network system to perform communication between electronic control units (ECUs) of the vehicle 1 as well as to control the ECUs. In particular, the CAN may transmit data through a pair of twisted data lines or a pair of shield data lines shielded with a covering material. The CAN may operate according to multi-master principles in which each ECU for use in master/slave systems may operate as a master. The controller 220 may also perform data communication either through an in-vehicle wired network (for example, a Local Interconnect Network (LIN), Media Oriented System Transport (MOST), etc. of the vehicle 1) or through a wireless network such as a Bluetooth network.

The controller 220 may include a memory to store programs for performing the aforementioned and following operations and various kinds of data associated with the programs, a processor to execute the programs stored in the memory, and a hydraulic control unit (HCU), a microcontroller unit (MCU), etc. each of which acts as a hydraulic control device. The controller 220 may be integrated into a System On Chip (SOC) embedded in each vehicle 1, and may operate by the processor. However, one or more SOCs may be embedded in the vehicle 1, and the scope or spirit of the present disclosure is not limited to only one SOC.

The controller 220 may be implemented as at least one of a flash memory type, a hard disk type, a multimedia card micro type, a card type memory (e.g. a Secure Digital (SD) memory or an eXtreme Digital (XD) memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, an optical disc, etc. However, the scope or spirit of the controller 220 according to the present disclosure is not limited thereto, and may also be implemented as another format well known to those skilled in the art.

In accordance with one embodiment, the controller 220 may monitor SOC of the battery 200 through the battery sensor 210, and may calculate an EV available range of the vehicle 1 according to an SOC level.

When a driver who rides in the vehicle 1 establishes a destination through the AVN device 80, the controller 220 may calculate a distance to the destination by analyzing a route from a current position to the destination, and may calculate total drive energy, etc.

Therefore, the controller 220 may select an optimum driving mode on the basis of the navigation route analysis result and the EV available range result of the vehicle 1.

The controller 220 may recommend an optimum driving mode to the driver on the basis of the navigation route analysis result and the EV available range of the vehicle 1.

The controller 220 may display an SOC of the battery 200 and an estimated charge time of the battery 200 on a navigation screen image, and may control the battery 200 to be charged.

An inverter 230 may convert a voltage of the battery 200 into multiphase AC power (also called polyphase AC power)

(for example, 3-phase (composed of U-phase, V-phase, and W-phase) AC power), and may provide the multiphase AC power to the motor 30. To this end, a control signal for controlling a format of multiphase AC power produced by the inverter 230 may be applied to the inverter 230.

The motor 30 may be driven by multiphase AC power of the inverter 230 so as to generate power (rotational force). The rotational force of the motor 30 may be used to rotate front wheels 21 or rear wheels 22 of the vehicle 1.

The converter 240 may step up (boost) or step down (reduce) DC power received from the battery 200 by a predetermined level. DC power generated from the converter 240 may be supplied to various electronic devices (e.g., lamps, controllers, multimedia devices, etc.) embedded in the vehicle 1.

In accordance with one embodiment, the converter 240 may power on the touchscreen 81 (see FIG. 2) embedded in the vehicle 1 such that multimedia information (i.e., a navigation screen image) is provided to a user (driver) through the touchscreen 81.

The memory 250 may store data or software/firmware needed when the controller 220 performs control. Specifically, the memory 250 may store a navigation schedule (or running schedule) of the vehicle 1, a setting temperature of the air conditioner 90, SOC information of the battery 200, etc.

Although the memory 250 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto. The memory 250 may be a memory that is implemented as a separate chip independent of the controller 300, or may be implemented as a processor and a single chip.

The engine 300 may generate mechanical power by burning fossil fuels such as gasoline or diesel, and may transmit the generated power to the clutch 310.

The clutch 310 may be disposed between the engine 300 and the motor 30.

The clutch 310 may be closed or locked when driving power of the wheels 21 and 22 is generated using the engine 300 and the motor 30. When driving power of the wheels 21 and 22 is generated only using the motor 310, a spring (not shown) is pressed by hydraulic pressure generated by driving of a Hydraulic Clutch Actuator (HCA), so that the clutch 310 may be opened.

That is, an open or closed state of the clutch 310 may be decided according to the driving mode of the vehicle 1. In particular, the clutch 310 may be opened when the vehicle travels in an acceleration mode or a low-speed mode using the motor 30. The clutch 310 may also be opened during braking of the vehicle 1. During a climbing mode, an acceleration mode, or a cruise control mode of more than a constant speed, the clutch 310 may be closed. In addition, during a protection mode of the battery 200, the clutch 310 may also be closed.

The clutch 310 may be a normal-close-type clutch in a manner that the engine 300 is connected to the motor 30 when the vehicle 1 is powered off.

In accordance with one embodiment, a power source of the vehicle 1 may construct a parallel structure in which the engine 300 and the motor 30 are simultaneously connected to an axle of the vehicle 1 such that the engine 300 and the motor 30 can simultaneously drive the vehicle 1.

The vehicle 1 may open the clutch 310 when driving in the EV mode only using the motor 30 in a manner that the motor 30 is not mechanically connected to the engine 300 and rotational force of the motor 30 can be immediately transmitted to a transmission. In this case, the engine 300 is in a drive-OFF state. During charging of the battery 200, the engine 300 may be in a drive-ON state.

When the vehicle 1 drives in the HEV mode by simultaneous operation of the engine 300 and the motor 30, the vehicle 1 may close the clutch 310, so that rotational force of the engine 300 is added to rotational force of the motor 30 and the added result is then transmitted to the transmission.

Since the engine must be connected to the axle even when the vehicle 1 is driven only using the engine 300, the clutch 310 is closed in a manner that the engine 300 can rotate along with the motor 30.

In accordance with one embodiment, the AVN device 80 may interact with the air conditioner 90 so that the AVN device 80 may display various control screen images associated with control of the air conditioner 90 on the touchscreen 81. The AVN device 80 may adjust the air conditioning environment in the indoor space of the vehicle 1 by controlling an operation state of the air conditioner 90. The AVN device 80 may allow the driver who rides in the vehicle 1 to establish a desired destination through the touchscreen 81, and may allow the driver to view a map on which a route to the destination is displayed.

The AVN device 80 may include the touchscreen 81 for displaying various kinds of information indicating a current state of the vehicle 1, for example, a navigation screen, an audio screen, a state of the air conditioner 90, etc. The touchscreen 81 may display an EV available range of the vehicle 1, a charging station search, a battery SOC, etc. such that the touchscreen 81 may display information needed when the battery 200 of the vehicle 1 is driven by the user or driver. The EV available range may display a maximum range in which the vehicle 1 can travel at a current SOC of the battery 200. The charging station search may provide the user or driver with the position of a charging station located in a peripheral region of the vehicle 1. The battery SOC may denote the SOC of the battery 200 as a percentage (%).

The touchscreen 81 may display a charging time indicating a start time of charging the battery 200 and a charging time setting menu through which the user can change the charging start time.

In accordance with one embodiment, the touchscreen 81 may display a user setting screen image of the navigation in a manner that the driver can establish a desired destination using the touchscreen 81.

Operations and effects of the vehicle and the method for controlling the same according to one embodiment of the present disclosure will hereinafter be described with reference to FIG. 4.

Figure 4:
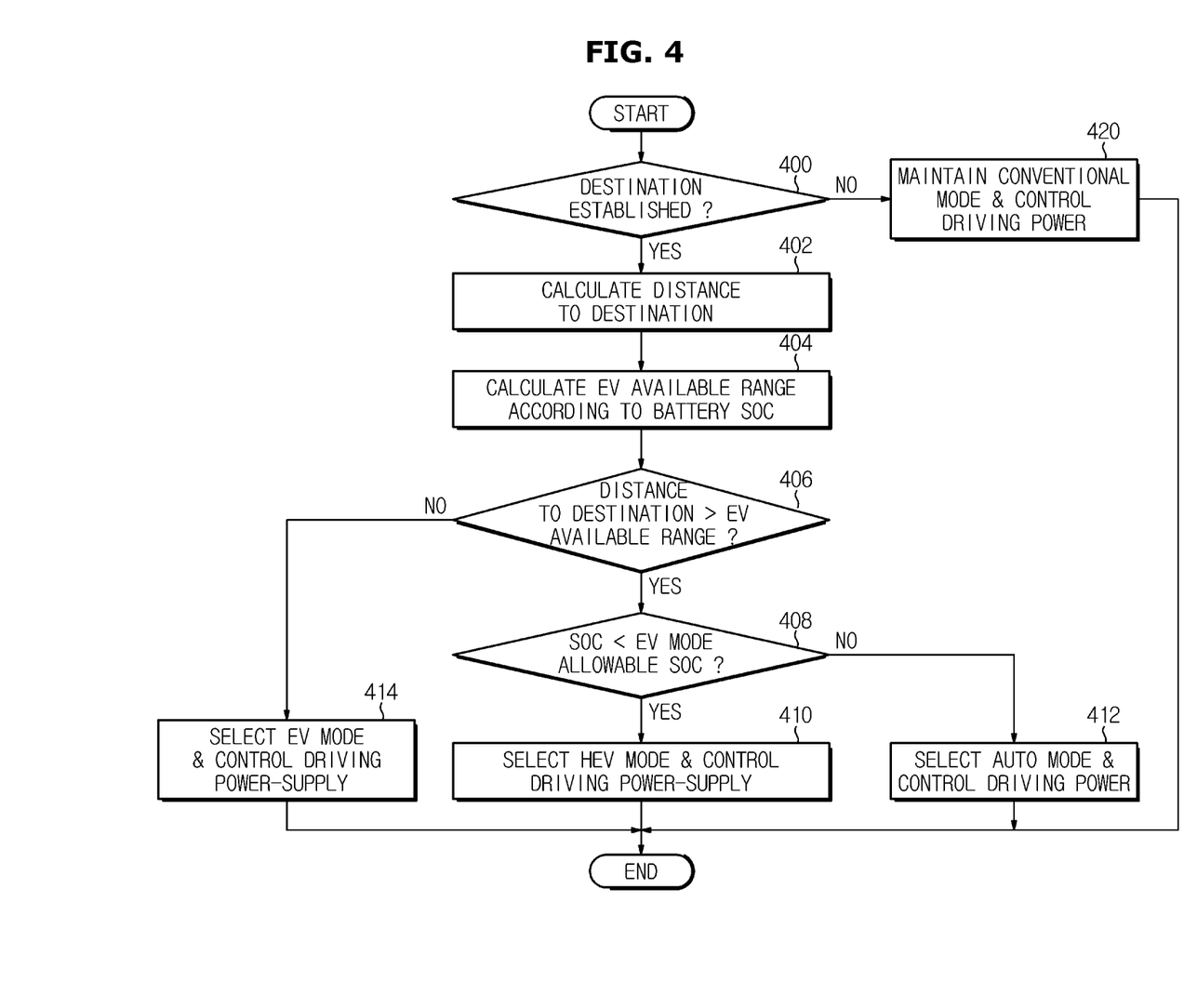
FIG. 4 is a flowchart illustrating a control algorithm for selecting a driving mode of the vehicle according to an embodiment of the present disclosure.

FIG. 4 is a flowchart illustrating a control algorithm for selecting a driving mode of the vehicle according to an embodiment of the present disclosure.

Referring to FIG. 4, when the vehicle 1 starts driving, the driver may establish a desired destination through the touchscreen 81 of the AVN device 80 (400). In a method for establishing the destination, the user may input keyword(s), for example, a name or address of the destination, through a destination search screen image. When the user inputs the keyword, the AVN device 80 may display the user-input keyword on a destination display region of the destination setting screen image displayed on the touchscreen 81.

When the destination is established, the controller 220 may analyze a route from a current position to the destination using a route search algorithm of the AVN device 80, and may thus calculate a distance to the destination and total driving energy (402) based on the analyzed route (402).

Subsequently, the controller 220 may monitor SOC of the battery 200 through the battery sensor 210, and may calculate the EV available range of the vehicle 1 and the available driving energy on the basis of the SOC level of the battery 200 (404).

Therefore, the controller 220 may analyze a route to the destination, may compare a distance to the destination with the EV available range calculated through SOC level of the battery 200, and may determine whether the distance to the destination is longer than the EV available range (406).

When the distance to the destination is longer than the EV available range (406), the controller 220 may determine that the vehicle 1 has difficulty in proceeding to the destination only using electrical power, and may determine whether a current SOC of the battery 200 is less than the EV mode allowable SOC (i.e., SOC level at which the vehicle can drive in the EV mode) (408).

When the current SOC of the battery 200 is less than the EV mode allowable SOC (408), the controller 220 may determine that the vehicle 1 has difficulty in proceeding to the destination only using electrical power, may select the HEV mode in which the engine power and the electrical power are mixedly used as a driving mode, and may control driving power (410). Driving control based on the HEV mode may indicate that the engine power and the electrical power are mixedly used when the SOC of the high-voltage battery 200 is in the SOC region in which the vehicle cannot enter the EV mode.

Meanwhile, when a current SOC of the battery 200 is not less than the EV mode allowable SOC (408), the controller 220 may sufficiently use the SOC of the battery 200 until reaching the EV mode release SOC, and may select the AUTO mode in which the engine power is properly distributed as a driving mode, thereby controlling driving power (412). Driving power control based on the AUTO mode may use the engine power while simultaneously consuming the entire energy of the high-voltage battery 200 on a total driving route.

When the distance to the destination is not longer than the EV available range (406), the controller 220 may determine that the vehicle can proceed to the destination only using the electrical power, and may select the EV mode as a driving mode, thereby controlling driving power (414). Driving power control based on the EV mode may be achieved centering upon the electrical power source. In this case, when power requested by the user or driver is higher than maximum electrical power, the vehicle may be controlled to use the engine power only.

When the destination is not established (400), the controller 220 may maintain a conventional traveling mode and at the same time may control driving power (420).

As described above, the controller 220 may first select a first driving mode on the basis of the navigation route analysis result and the EV available range of the vehicle 1, and may then select a second driving mode based on the SOC information of the battery 200, thereby selecting an optimum driving mode.

Therefore, the controller 220 may determine whether to automatically enter the optimum driving mode according to the driver's option selection result, or may recommend the optimum driving mode to the driver, or may determine whether the optimum driving mode is first recommended to the driver and is then started only when the driver selects the optimum driving mode according to the driver's option selection result.

A method for controlling a power source based on the driving mode will hereinafter be described in detail.

The driving mode of the vehicle 1 may be classified into an EV mode, an HEV mode, and an AUTO mode.

The EV mode may denote a driving mode in which the vehicle 1 is driven only using the electrical power of the motor 30. When the driver-requested power is higher than the maximum electrical power, the vehicle may use the engine power. Therefore, the EV mode is made available only when the SOC of the high-voltage battery 200 is equal to or higher than a predetermined value.

During the EV mode, the vehicle is driven using only the electrical power, such that the vehicle generates less noise and is comfortable to drive in. Moreover, when the vehicle drives a short distance in which the vehicle can drive in the EV mode after being charged with electricity, superior fuel efficiency can be acquired.

During the HEV mode, the vehicle is driven using a combination of the engine power and the electrical power of the motor 30, the vehicle may use the same power distribution method as in the conventional HEY. Therefore, the HEV mode may use only a specific range (HEV level) of the SOC band, instead of using the entire range of the high-voltage battery 200.

The vehicle is driven using a combination of the engine power and the electrical power during the HEV mode. Therefore, the HEV mode is the most efficient driving mode when the SOC of the high-voltage battery 200 is in the SOC region in which the vehicle is unable to enter the EV mode.

During the AUTO mode, the engine power and the electrical power are properly distributed in consideration of a driving situation so as to implement high fuel efficiency in the high-voltage battery 200's SOC in which the vehicle can enter the EV mode. During the AUTO mode, the vehicle can sufficiently use the battery SOC until reaching the destination after the destination has been established, such that the vehicle can further increase fuel efficiency until reaching the SOC in which the EV mode is released.

The AUTO mode may allow the vehicle to drive at superior fuel efficiency when the vehicle drives a long distance on the condition that the vehicle cannot drive in the EV mode.

If necessary, not only the EV mode, the HEV mode, and the AUTO mode, but also other appropriate operation modes (e.g., a mandatory charging mode, etc.) may also be used according to characteristics of the vehicle 1.

Typically, the vehicle drives a short distance in the EV mode. During the EV mode, the controller 220 may set a requested power amount at which the vehicle starts operation only using the engine 300, to the maximum power (Max Power) of the electrical power obtained from the motor 30.

The vehicle 1 may switch to the HEV mode. When the vehicle 1 drives in the Charge Sustaining (CS) mode, the controller 220 may set the engine power at which the engine 300 starts operation to a low-level engine power.

However, according to one embodiment, when the vehicle drives in the automatically variable Charge Depleting (CD) mode, the controller 220 may control the engine power to be disposed between the CS mode engine power and the Max Power. That is, the controller 20 reduces the requested power amount at which the vehicle starts driving using the engine 300, and can control the vehicle 1 to quickly switch from the EV mode to the HEV mode.

Meanwhile, although the embodiment of the present disclosure has exemplarily disclosed that, the traveling mode of the vehicle 1 is divided into the HEV mode and the EV mode, the scope or spirit of the present disclosure is not limited thereto, the traveling mode of the vehicle 1 may be classified into the CD mode and the CS mode.

As is apparent from the above description, the vehicle and the method for controlling the same according to the embodiments of the present disclosure may automatically select an optimum driving mode from among various driving modes capable of being selected by the PHEV according to a driving situation based on a destination established by a driver who uses a navigation system, or may recommend various driving modes to the driver, resulting in increased convenience of use. In addition, through selection of an appropriate driving mode, the vehicle can be driven with superior fuel efficiency, resulting in increased driving efficiency.

Although a few embodiments of the present disclosure have been shown and described, it would be appreciated by those skilled in the art that changes may be made in these embodiments without departing from the principle and spirit of the disclosure, the scope of which is defined in the claims and their equivalents.

What is claimed is:

1. A vehicle comprising:
  a battery;
  a battery sensor configured to measure a State of Charge (SOC) of the battery;
  an Audio Video Navigation (AVN) device configured to establish a destination by a driver who rides in the vehicle; and
  a controller configured to calculate a distance to the destination by analyzing information regarding a route to the established destination, and calculate an Electric Vehicle (EV) available range according to a level of the SOC of the battery,
  wherein the controller selects a driving mode by comparing the distance to the destination with the EV available range,
  wherein the driving mode includes:
    an electric vehicle (EV) mode in which the vehicle is driven only using electrical power of a motor;
    a hybrid electric vehicle (HEV) mode in which the vehicle is driven using a combination of engine power and the electrical power according to the SOC level; and
    an automatic (AUTO) mode in which the vehicle is driven using distribution of the engine power and the electrical power according to the SOC level, and
  wherein the controller compares the distance to the destination with the EV available range, and recommends the driving mode to the driver.

2. The vehicle according to claim 1, wherein:
  when the distance to the destination is shorter than the EV available range, the controller selects the EV mode as the driving mode.

3. The vehicle according to claim 2, wherein:
  when the distance to the destination is longer than the EV available range, the controller selects the driving mode according to the SOC level.

4. The vehicle according to claim 3, wherein:
  the controller compares the SOC level with an EV mode allowable SOC, and selects the HEV mode as the driving mode when the SOC level is less than the EV mode allowable SOC.

5. The vehicle according to claim 4, wherein:
  when the SOC level is higher than the EV mode allowable SOC, the controller selects the AUTO mode as the driving mode.

6. The vehicle according to claim 5, further comprising:
  a power device configured to generate driving power using the engine power and the electrical power,
  wherein the controller controls the power device according to the selected driving mode.

7. A vehicle configured to be driven using at least one of engine power and electrical power of a motor, comprising:
  a battery configured to supply drive energy of the motor;
  a battery sensor configured to measure a State of Charge (SOC) of the battery;
  an Audio Video Navigation (AVN) device configured to search for a route to a destination established by a driver who rides in the vehicle; and
  a controller configured to calculate a distance to the destination by analyzing the searched route information, and calculate an Electric Vehicle (EV) available range according to a level of the SOC of the battery,
  wherein the controller selects a driving mode on the basis of the route analysis result and the calculated EV available range,
  wherein the controller recommends the driving mode to the driver on the basis of the route analysis result and the calculated EV available range, and
  wherein the driving mode includes:
    an electric vehicle (EV) mode in which the vehicle is driven only using the electrical power;
    a hybrid electric vehicle (HEV) mode in which the vehicle is driven using a combination of the engine power and the electrical power according to the SOC level; and
    an automatic (AUTO) mode in which the vehicle is driven using distribution of the engine power and the electrical power according to the SOC level.

8. The vehicle according to claim 7, wherein the controller controls the engine power and the electrical power according to the selected driving mode.

9. A method for controlling a vehicle that includes an engine, a motor, and battery, the vehicle configured to be driven using at least one of engine power and electrical power of the motor, the method comprising:
  allowing a driver who rides in the vehicle to establish a destination through an Audio Video Navigation (AVN) device;
  calculating a distance to the destination by analyzing information regarding a route to the established destination;
  measuring a State of Charge (SOC) of the battery, and calculating an electric vehicle (EV) available range according to a level of the SOC;
  comparing the calculated distance to the destination with the calculated EV available range, and selecting a driving mode according to the result of comparison; and
  comparing the distance to the destination with the EV available range, and recommending the driving mode to the driver,
  wherein the driving mode includes:
    an electric vehicle (EV) mode in which the vehicle is driven only using the electrical power;

a hybrid electric vehicle (HEV) mode in which the vehicle is driven using a combination of the engine power and the electrical power according to the SOC level; and an automatic (AUTO) mode in which the vehicle is driven using distribution of the engine power and the electrical power according to the SOC level.

10. The method according to claim 9, further comprising:
when the distance to the destination is shorter than the EV available range, selecting the EV mode as the driving mode.

11. The method according to claim 10, further comprising:
when the distance to the destination is longer than the EV available range, comparing the SOC level with the EV mode allowable SOC, and selecting the driving mode according to the result of comparison.

12. The method according to claim 11, further comprising:
selecting the HEV mode as the driving mode when the SOC level is less than the EV mode allowable SOC.

13. The method according to claim 12, further comprising:
selecting the AUTO mode as the driving mode when the SOC level is higher than the EV mode allowable SOC.

14. The method according to claim 13, wherein the AUTO mode is configured to control driving power in a manner that the vehicle is driven using the engine power while simultaneously consuming all of the SOC of the battery.

15. The method according to claim 13, further comprising:
controlling the engine power and the electrical power according to the selected driving mode.

* * * * *